(12) United States Patent
Shirai et al.

(10) Patent No.: US 6,677,568 B2
(45) Date of Patent: Jan. 13, 2004

(54) SURVEYING INSTRUMENT HAVING A PHASE-DIFFERENCE DETECTION TYPE FOCUS DETECTING DEVICE

(75) Inventors: Masami Shirai, Saitama (JP); Homu Takayama, Saitama (JP); Kenji Kaneko, Tokyo (JP)

(73) Assignees: Pentax Corporation, Tokyo (JP); Pentax Precision Co., Ltd., Tokyo (JP)

( * ) Notice: Subject to any disclaimer, the term of this patent is extended or adjusted under 35 U.S.C. 154(b) by 123 days.

(21) Appl. No.: 09/852,019

(22) Filed: May 10, 2001

(65) Prior Publication Data

US 2002/0008189 A1 Jan. 24, 2002

(30) Foreign Application Priority Data

May 11, 2000 (JP) ........................................ 2000-138313

(51) Int. Cl.[7] ................................................. G03B 3/00
(52) U.S. Cl. ..................... 250/201.7; 250/216; 356/4.04
(58) Field of Search ........................... 250/201.1–201.8, 250/216; 356/4.04, 4.05, 624, 614; 359/426

(56) References Cited

U.S. PATENT DOCUMENTS

| | | | |
|---|---|---|---|
| 3,768,910 A | * 10/1973 | Zanoni | 356/624 |
| 4,620,089 A | * 10/1986 | Schlichting et al. | 250/201.4 |
| 5,886,340 A | 3/1999 | Suzuki et al. | 250/201.7 |
| 5,886,777 A | 3/1999 | Hirunuma | 356/5.12 |
| 5,923,468 A | 7/1999 | Tsuda et al. | 359/426 |
| 5,936,736 A | * 8/1999 | Suzuki et al. | 356/624 |
| 5,949,548 A | 9/1999 | Shirai et al. | 356/614 |
| 6,072,642 A | 6/2000 | Shirai | 359/823 |
| 6,194,694 B1 | 2/2001 | Shirai | 250/201.2 |

* cited by examiner

*Primary Examiner*—David Porta
*Assistant Examiner*—Stephen Yam
(74) *Attorney, Agent, or Firm*—Greenblum & Bernstein, P.L.C.

(57) ABSTRACT

A surveying instrument includes a sighting telescope having an objective lens and an eyepiece; a Porro-prism erecting system; a semitransparent surface formed on a reflection surface of the Porro-prism erecting system; a beam splitting prism adhered to the semitransparent surface; and a focus detecting device which detects a focus state from a correlation between a pair of images respectively formed by two light bundles which are respectively passed through two different pupil areas of the objective lens and passed through two separate areas on the semitransparent surface. An area of a surface of the beam splitting prism which is adhered to the semitransparent surface is smaller than an effective area of the reflection surface of the Porro-prism erecting system. The semitransparent surface and the beam splitting prism are positioned so that the two light bundles are incident on the semitransparent surface at the same incident angle.

7 Claims, 5 Drawing Sheets

SURVEYING INSTRUMENT HAVING A PHASE-DIFFERENCE DETECTION TYPE FOCUS DETECTING DEVICE

BACKGROUND OF THE INVENTION

1. Field of the Invention

The present invention relates to a surveying instrument having a phase-difference detection type focus detecting device.

2. Description of the Related Art

Advancements have been made in the development of surveying instruments (e.g., a total station) provided with a sighting telescope (collimating telescope) having an auto-focus system, wherein phase-difference detection type autofocus system is widely used in the autofocus operation therefor. With this system, an in-focus state is detected based on the correlation between two images formed by two light bundles which are respectively passed through two different pupil areas upon passing through different portions of an objective lens of the sighting telescope to automatically focus the sighting telescope on a sighting object in accordance with the detected in-focus state.

A typical surveying instrument provided with a sighting telescope having a phase-difference detection type autofocus system adopts a Porro-prism erecting system as an erecting optical system for changing an inverted image formed through the objective lens of the sighting telescope into an erect image. One of the four reflection surfaces of the Porro-prism erecting system is formed to serve as a beam splitting surface which splits the incident light bundle into two light bundles so that one of the two light bundles proceeds toward a phase-difference detection type AF sensor unit (phase-difference detection type focus detecting device) while the other light bundle proceeds toward the eyepiece of the sighting telescope. Although each of the four reflection surfaces can be formed as such a beam splitting surface, no attention has been directed to the matter of which of the four reflection surfaces is the most appropriate to be formed as the beam splitting surface. Conventionally, when one of the four reflection surfaces is formed as the beam splitting surface, the whole effective area of the reflection surface which reflects light bundles traveling toward the eyepiece of the sighting telescope is formed as a semitransparent surface (e.g., a half-silvered surface), while a beam splitting prism is adhered to the whole surface of the semitransparent surface. Due to this structure, the beam splitting prism projects largely from the Porro-prism erecting system, which makes it difficult to design a small sighting telescope. Moreover, the field of view of the sighting telescope becomes dark when a surveyor views a sighting object through the sighting telescope since the semitransparent surface spreads over the whole field of view of the sighting telescope, i.e., the whole field of view of the sighting telescope is viewed through the semitransparent surface.

SUMMARY OF THE INVENTION

The present invention has been devised in view of the problems noted above, and accordingly, an object of the present invention is to provide a compact surveying instrument having a phase-difference detection type focus detecting device and a Porro-prism erecting system provided with a beam splitting surface, wherein a bright field of view of the sighting telescope is achieved.

To achieve the objects mentioned above, according to an aspect of the present invention, a surveying instrument is provided, including a sighting telescope having an objective lens and an eyepiece for sighting an object; a Porro-prism erecting system positioned between the objective lens and the eyepiece; a semitransparent surface formed on a reflection surface of the Porro-prism erecting system; a beam splitting prism adhered to the semitransparent surface; and a phase-difference detection type focus detecting device which is positioned to receive light which is passed through the semitransparent surface and the beam splitting prism to detect a focus state from a correlation between a pair of images respectively formed by two light bundles which are respectively passed through two different pupil areas of the objective lens and passed through two separate areas on the semitransparent surface. An area of a surface of the beam splitting prism which is adhered to the semitransparent surface is smaller than an effective area of the reflection surface of the Porro-prism erecting system. The semitransparent surface and the beam splitting prism are positioned so that the two light bundles which are respectively passed through the two different pupil areas of the objective lens are incident on the semitransparent surface at the same incident angle.

In an embodiment, the reflection surface of the Porro-prism erecting system, on which the semitransparent surface is formed, constitutes a first reflection surface of the Porro-prism erecting system. A width of the beam splitting prism is identical to a width of the first reflection surface, and a length of the beam splitting prism, which is adhered to the semitransparent surface, is shorter than a length of the first reflection surface, the semitransparent surface having an elongated shape. The elongated shape of the beam splitting prism is determined so that the two light bundles which are respectively passed through the two different portions of the objective lens are incident on the first reflection surface at the same incident angle.

In an embodiment, a portion of the first reflection surface to which the beam splitting prism is not adhered is covered by a semitransparent material so that variation of the phase angle of light before and after the light is incident on the portion of the first reflection surface becomes approximately equal to the phase angle before and after the light is incident on the semitransparent surface.

In an embodiment, the semitransparent surface is formed on the whole effective area of the first reflection surface.

Preferably, the length of the beam splitting prism, in a direction of the optical axis of the sighting telescope, is less than a thickness of the Porro-prism erecting system.

In an embodiment, the Porro-prism erecting system includes three right angle prisms which include the first reflection surface, a second reflection surface, a third reflection surface and a fourth reflection surface.

In an embodiment, the portion of the first reflection surface is covered by the semitransparent material to be formed as a semitransparent surface.

In an embodiment, a light shield mask is further provided, positioned between an exit surface of the beam splitting prism and phase-difference detection type focus detecting device.

In an embodiment, the sighting telescope includes a focus adjustment lens positioned between the objective lens and the Porro-prism erecting system.

The present disclosure relates to subject matter contained in Japanese Patent Application No.2000-138313 (filed on May 11, 2000) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

FIGS. 1 through 6 show the first embodiment of an electronic distance meter (EDM) equipped with an autofocus system, according to the present invention. This electronic distance meter can be incorporated in or attached to a surveying instrument such as a total station. Firstly, the overall structure of the electronic distance meter will be hereinafter discussed.

Figure 1:
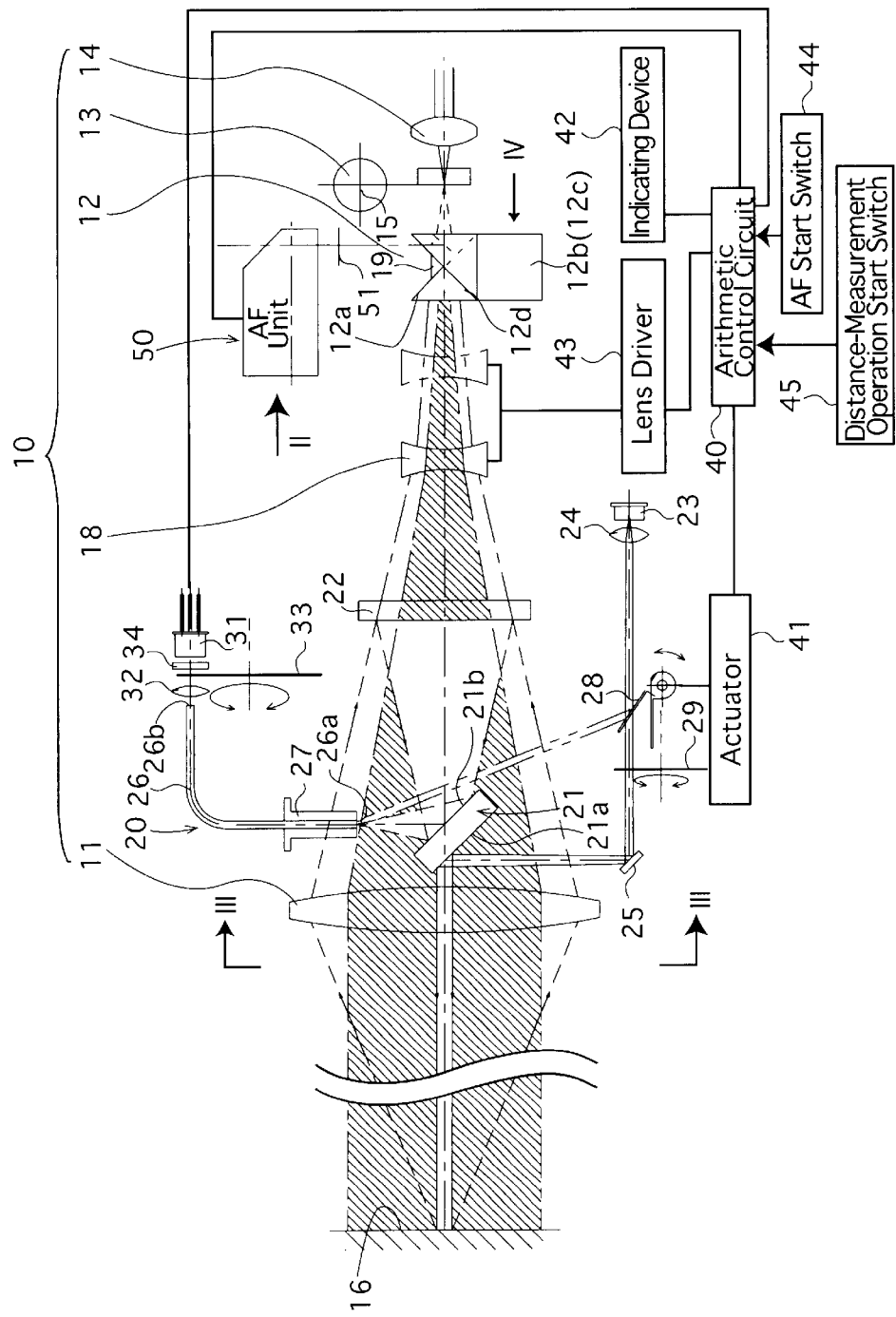
FIG. 1 is a schematic diagram of the first embodiment of an electronic distance meter having a phase-difference detection type focus detecting device, according to the present invention.

The electronic distance meter is provided with a sighting telescope (sighting telescope optical system) 10 and an optical distance meter 20. As shown in FIG. 1, the sighting telescope 10 is provided with an objective lens 11, a focusing lens 18, a Porro-prism erecting system (erecting optical system) 12, a focal-plane plate (reticle plate) 13, and an eyepiece lens 14, in that order from the object side (i.e., left to right as shown in FIG. 1). The focal-plane plate 13 is provided thereon with a reticle (cross hair) 15. The focusing lens 18 is guided in the direction of the optical axis thereof. The image of an object (sighting object) 16 that is formed through the objective lens 11 can be precisely focused on the front surface (the surface facing the objective lens 11) of the focal-plane plate 13 by adjusting the axial position of the focusing lens 18 in accordance with the distance of the sighting object 16 with respect to the sighting telescope 10. The user (surveyor) of the surveying instrument sights a magnified image of the sighting object 16, which is focused on the focal-plane plate 13, via the eyepiece 14.

The electronic distance meter is provided, behind the objective lens 11 of the sighting telescope 10, with a light transmitting/receiving mirror 21 and a wavelength selection filter 22, which are arranged in that order from the object side. The light transmitting/receiving mirror 21 and the wavelength selection filter 22 are optical elements of a light-receiving optical system of the optical distance meter 20. The light transmitting/receiving mirror 21 is made of a parallel-plate mirror having front and rear parallel surfaces positioned on the optical axis of the objective lens 11. The front surface of the parallel-plate mirror which faces the objective lens 11 is formed as a light transmitting mirror 21a, while the rear surface of the parallel-plate mirror which faces the wavelength selection filter 22 is formed as a light receiving mirror 21b.

The optical distance meter 20 is provided with a light-emitting element (laser diode) 23 which emits light (measuring light) having a specific wavelength. The measuring light emitted from the light-emitting element 23 is incident on the light transmitting mirror 21a via a collimating lens 24 and a fixed mirror 25. The measuring light is then reflected by the light transmitting mirror 21a to proceed toward the sighting object 16 along the optical axis of the objective lens 11. The collimating lens 24, the fixed mirror 25 and the light transmitting mirror 21a (light transmitting/receiving mirror 21) are optical elements of a light-transmitting optical system of the optical distance meter 20.

The measuring light which is reflected by the sighting object 16 to be passed through the objective lens 11 is reflected back to the light receiving mirror 21b via the wavelength selection filter 22. Thereafter, the light receiving mirror 21b reflects the incident measuring light so as to make the measuring light enter at an incident end surface 26a of a light receiving optical fiber 26. A fiber holder 27 supports the incident end of the light receiving optical fiber 26 which has the incident end surface 26a. The fiber holder 27 is immovably supported together with the light transmitting/receiving mirror 21 by a fixing device (not shown) provided in a space behind the objective lens 11.

The electronic distance meter is provided between the light-emitting element 23 and the fixed mirror 25, on a distance-measuring optical path, with a switching mirror 28 and a first ND filter 29. The light (measuring light) emitted by the light-emitting element 23 is incident on the fixed mirror 25 when the switching mirror 28 is retracted from the optical path between the collimating lens 24 and the fixed mirror 25, and the light (internal reference light) emitted by the light-emitting element 23 is reflected by the switching mirror 28 to be incident directly on the incident end surface 26a of the light receiving optical fiber 26 when the switching mirror 28 is positioned in the optical path between the collimating lens 24 and the fixed mirror 25. The first ND filter 29 is used to adjust the amount of light of the measuring light incident on the sighting object 16.

The electronic distance meter is provided between an exit end surface 26b of the light receiving optical fiber 26 and a light-receiving element 31 with a condenser lens 32, a second ND filter 33 and a band-pass filter 34, in that order from the exit end surface 26b to the light-receiving element 31. The light-receiving element 31 is connected to an arithmetic control circuit (controller) 40. The arithmetic control circuit 40 is connected to an actuator 41 which drives the switching mirror 28, and an indicating device (e.g., an LCD panel) 42 which indicates the calculated distance.

As known in the art, the optical distance meter 20 establishes two different states: one state wherein the measuring light emitted by the light-emitting element 23 is supplied to the fixed mirror 25, and another state wherein the same light (internal reference light) is directly supplied to the incident end surface 26a of the light receiving optical fiber 26, which are determined in accordance with the switching state of the switching mirror 28 driven by the arithmetic control circuit 40 via the actuator 41. As described above, the measuring light supplied to the fixed mirror 25 is projected toward the sighting object 16 via the light-transmitting mirror 21a and the objective lens 11, and the measuring light reflected by the sighting object 16 is incident on the incident end surface 26a via the objective lens 11, the wavelength selection filter 22, and the light receiving mirror 21b. Thereafter, both the measuring light reflected by the sighting object 16 to be eventually incident on the incident end surface 26a, and the internal reference light directly supplied to the incident end surface 26a via the switching mirror 28 are received by the light-receiving element 31. The arithmetic control circuit 40 detects the phase difference between the projecting light and the reflected light and the initial phase of the internal reference light, or the time difference between the projecting light and the reflected light, to calculate the distance from the electronic distance meter to the sighting object. The calculated distance is indicated by the indicating device 42. Such an operation of calculating the distance from the phase difference between the projecting light and the reflected light and from the initial phase of the internal reference light, or from the time difference between the projecting light and the reflected light is well known in the art.

Figure 4:
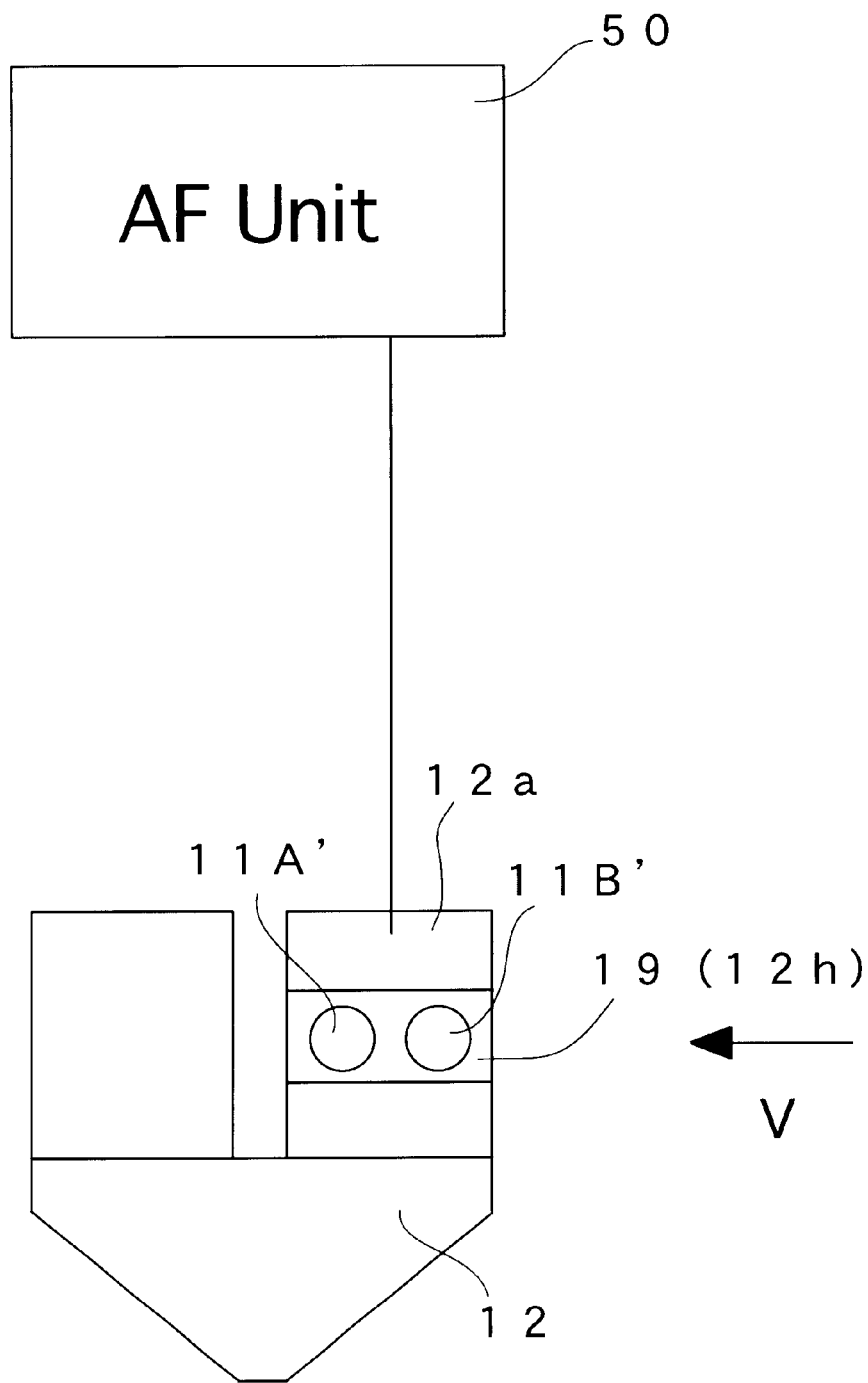
FIG. 4 is a rear elevational view of the AF sensor unit, the Porro-prism erecting system and a beam splitting prism fixed to the Porro-prism erecting system, viewed in the direction of an arrow IV shown in FIG. 1.

The Porro-prism erecting system 12 is of a type which employs three right angle prisms having four rectangular reflection surfaces: first through fourth reflection surfaces 12a, 12b, 12c and 12d, in that order from the side of the incident light. The Porro-prism erecting system 12 can be replaced by another type Porro-prism erecting system which employs two separate right angle prisms. In this case, two of the four rectangular reflection surfaces are formed on one of the two right angle prisms, while the other two rectangular reflection surfaces are formed on the other right angle prism. A part of the first reflection surface 12a is formed as a semitransparent surface (e.g., a half-silvered surface) 12h which serves as a beam splitting surface, while a specific surface of a beam splitting prism 19 is entirely adhered to the semitransparent surface 12h by an adhesive. As can be seen in FIGS. 4 and 6, the semitransparent surface 12h has a horizontally-elongated shape, while the beam splitting prism 19, which is adhered to the semitransparent surface 12h, also has a horizontally-elongated shape. The width (horizontal length as shown in FIG. 4) of each of the semitransparent surface 12h and the beam splitting prism 19 is identical to the width of the first reflection surface 12a, while the length of each of the semitransparent surface 12h and the beam splitting prism 19 is shorter than the length (a length in a slanting direction from lower left to upper right as viewed in FIG. 5) of the first reflection surface 12a. The lengthwise direction (a slanting direction from lower left to upper right as viewed in FIG. 5) of each of the semitransparent surface 12h and the beam splitting prism 19 corresponds to the slanting direction of the first reflection surface 12a. Accordingly, the area of each of the semitransparent surface 12h and the surface of the beam splitting prism 19 which is adhered to the semitransparent surface 12h is smaller than the effective area of the first reflection surface 12a. For instance, the area of the semitransparent surface 12h which is formed on the reflection surface 12a can be made equal to or smaller than a half (fifty percent) of the effective area of the first reflection surface 12a. Light bundles which enter the Porro-prism erecting system 12 from the objective lens 11 side and are subsequently incident on the remaining area of the first reflection surface 12a on which the semitransparent surface 12h is not formed (i.e., to which the beam splitting prism 19 is not fixed) are totally reflected by the first reflection surface 12a downwards with respect to FIGS. 4 and 5.

Figure 5:
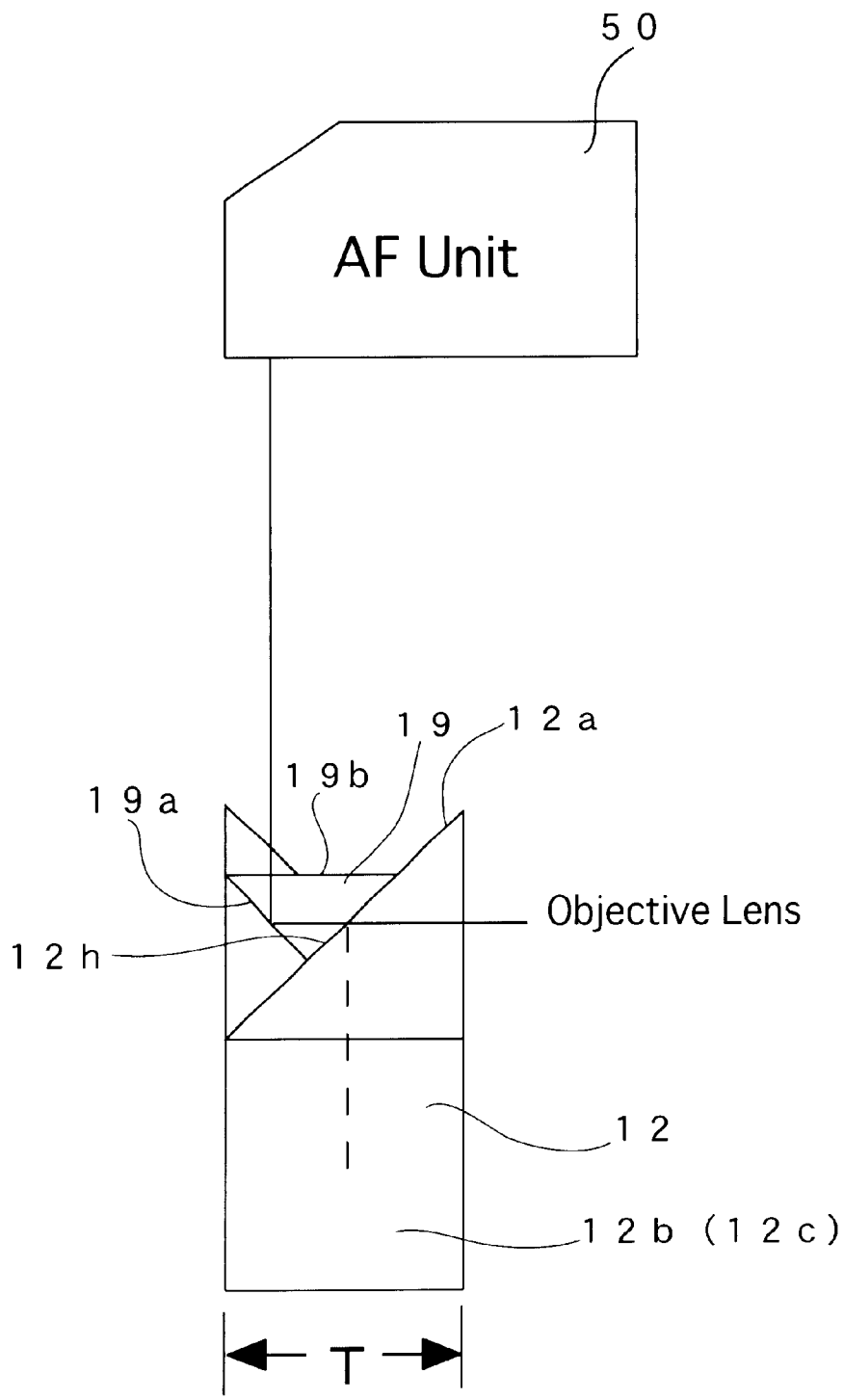
FIG. 5 is a side elevational view of the AF sensor unit, the Porro-prism erecting system and the beam splitting prism, viewed in the direction of an arrow V shown in FIG. 4.
Figure 6:
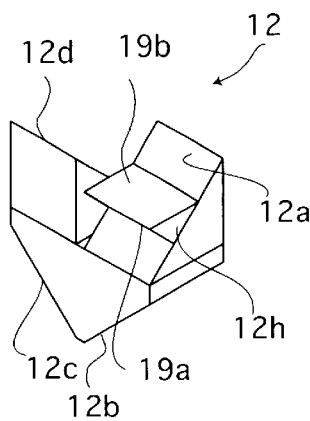
FIG. 6 is a perspective view of the Porro-prism erecting system and the beam splitting prism shown in FIG. 1.

As shown in FIG. 5, the beam splitting prism 19 is designed so that the thickness (i.e., a length in the horizontal direction as viewed in FIG. 5) of the Porro-prism erecting system 12 combined with the beam splitting prism 19 is within the thickness "T" of the Porro-prism erecting system 12 in the direction of the optical axis of the sighting telescope 10. Therefore, the beam splitting prism 19 does not project forward (leftward as viewed in FIG. 5) in the same optical axis direction from the front end (left end as viewed in FIG. 5) of the Porro-prism erecting system 12.

A light bundle which enters the Porro-prism erecting system 12 from the objective lens 11 side is either split by the semitransparent surface 12h into two light bundles or is totally reflected by the first reflection surface 12a at the portions thereof where the semitransparent surface 12h is not formed. One of the two light bundles split by the semitransparent surface 12h is reflected by a reflection surface 19a of the beam splitting prism 19 to emerge from an exit surface 19b of the beam splitting prism 19 to proceed toward an AF sensor unit 50 while the other light bundle are reflected three times by the second, third and fourth reflection surfaces 12b, 12c and 12d to proceed toward the focal-plane plate 13.

Figure 2:
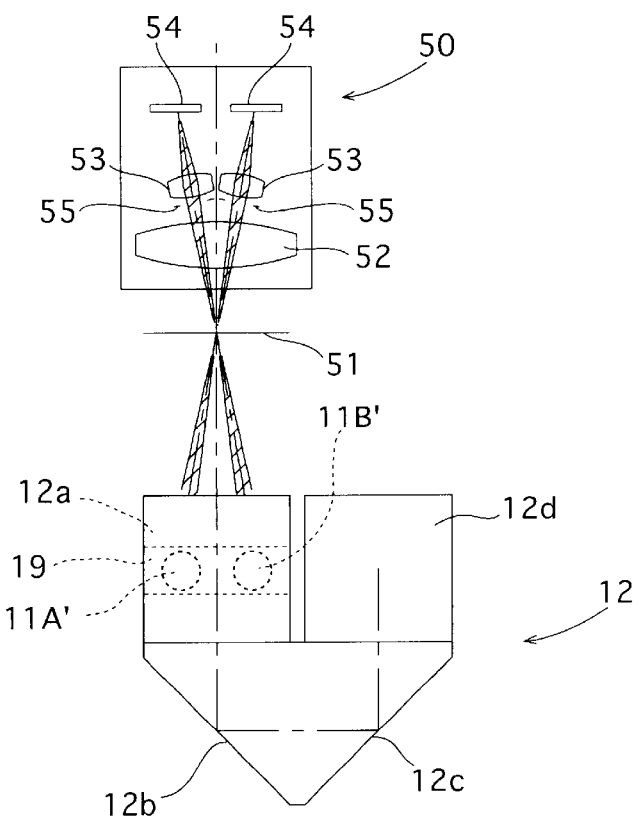
FIG. 2 is a conceptual diagram of the phase-difference detection type focus detecting device (AF sensor unit) and a Porro-prism erecting system, as viewed in the direction of an arrow II shown in FIG. 1.

A reference focal plane 51 (see FIGS. 1 and 2) is provided between the Porro-prism erecting system 12 and the AF sensor unit 50 and is located at a position optically equivalent to the position at which the reticle 15 of the focal-plane plate 13 is provided. The AF sensor unit 50 detects the focus state (amount of defocus and direction of focal shift) of the sighting telescope 10 on the reference focal plane 51. FIG. 2 shows a conceptual diagram of the AF sensor unit 50 and the Porro-prism erecting system 12. The AF sensor unit 50 includes a condenser lens 52, a pair of separator lenses 53, and a pair of line sensors (e.g., multi segment CCD sensors) 54 located behind the respective separator lenses 53. The pair of separator lenses 53 are arranged apart from each other by the base length. The image of the sighting object 11 formed on the reference focal plane 51 is separated into two images by the pair of separator lenses 53 to be respectively formed on the pair of line sensors 54. Each of the pair of line sensors 54 includes an array of photoelectric converting elements. Each photoelectric converting element converts the received light of an image into electric charges which are integrated (accumulated), and outputs as an integrated electric charge to the arithmetic control circuit 40 to constitute AF sensor data. The arithmetic control circuit 40 calculates an amount of defocus through a predetermined defocus operation in accordance with a pair of AF sensor data respectively input from the pair of line sensors 54. In an autofocus operation, the arithmetic control circuit 40 drives the objective lens 11 to bring the sighting object into focus via a lens driver 43 (see FIG. 1) in accordance with the calculated amount of defocus. The defocus operation is well-known in the art. An AF start switch 44 and a distance-measurement operation start switch 45 are connected to the arithmetic control circuit 40.

The AF sensor unit 50 detects an in-focus state from the pair of images respectively formed on the pair of line sensors 54 by two light bundles which are respectively passed through two different pupil areas 11A and 11B defined on the objective lens 11. The shape of each of the two pupil areas 11A and 11B are determined by the shape of the aperture formed on corresponding one of a pair of separator masks 55 which are respectively positioned in the vicinity of the pair of separator lenses 53 between the condenser lens 52 and the pair of separator lenses 53.

Figure 3:
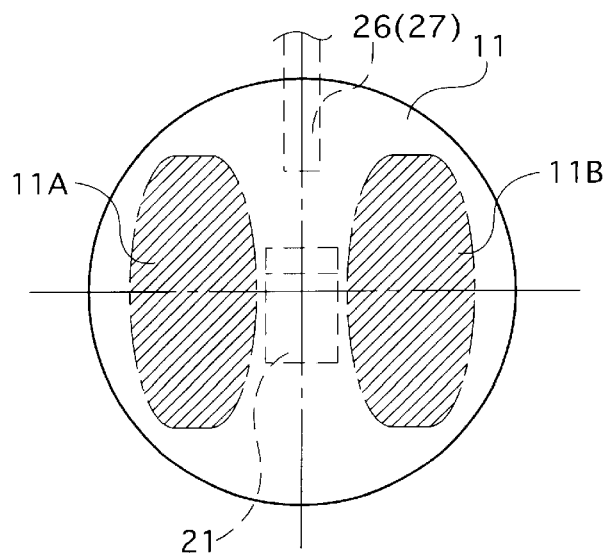
FIG. 3 is an explanatory view of an objective lens of a sighting telescope, as viewed in the direction of arrows III shown in FIG. 1, showing the positional relationship among a pair of pupil areas on the objective lens, a light transmitting/receiving mirror, and a light receiving fiber.

FIG. 3 shows the positional relationship between the two pupil areas 11A and 11B and the positional relationship between the light transmitting/receiving mirror 21 and the light receiving optical fiber 26 (the fiber holder 27) of the optical distance meter 20. Although the positions, shapes and directions of the two pupil areas 11A and 11B are determined by the condenser lens 52, the pair of separator lenses 53, the pair of separator masks 55, and the array of photoelectric converting elements of each line sensor 54 so as to satisfy the performance of autofocus, the directions of the two pupil areas 11A and 11B (the directions of the two pupil areas 11A and 11B relative to the center of the objective lens 11) can be determined comparatively freely. The semitransparent surface 12h of the Porro-prism erecting system 12 and the beam splitting prism 19 are positioned so that the two light bundles which are respectively passed through two separate areas 11A' and 11B' (see FIG. 2) on the semitransparent surface 12h are incident on the first reflection surface 12a at the same incident angle. The separate areas 11A' and 11B' are within the area of the exit surface 19b of the beam splitting prism 19.

The electronic distance meter equipped with an autofocus system which has the above described structure performs a distance measuring operation in a manner such as described in the following description.

In the first step, a surveyor (user) aims the sighting telescope 10 at the sighting object so that the optical axis of the sighting telescope 10 is generally in line with the sighting object, while viewing the sighting object through a collimator (not shown) which is attached to the sighting telescope 10. In the second step, the surveyor depresses the AF start switch 44 to perform the aforementioned autofocus operation to move the focusing lens 18 to an in-focus position (in-focus state) thereof relative to the sighting object. In the third step, in a state where the sighting telescope 10 is in focus relative to the sighting object 16, the surveyor adjusts the direction of the sighting telescope 10 so that the reticle (cross hair) 15 viewed through the eyepiece 14 is precisely centered on the sighting object 16 while looking into the eyepiece 14. In the fourth step, the surveyor depresses the distance-measurement operation start switch 45 to perform the aforementioned distance-calculating operation, wherein the calculated distance is indicated on the indicating device 42.

In this distance measuring operation, since a part of the effective area of the first reflection surface 12a of the Porro-prism erecting system 12 is formed as the semitransparent surface 12h while the remaining part of the effective area of the first reflection surface 12a is formed as a total reflection surface which totally reflects the incident light bundles, the field of view of the sighting telescope 20 which is viewed through the eyepiece 14 is brighter than that of the case where the whole effective area of the first reflection surface 12a is formed as a semitransparent surface.

Figure 7:
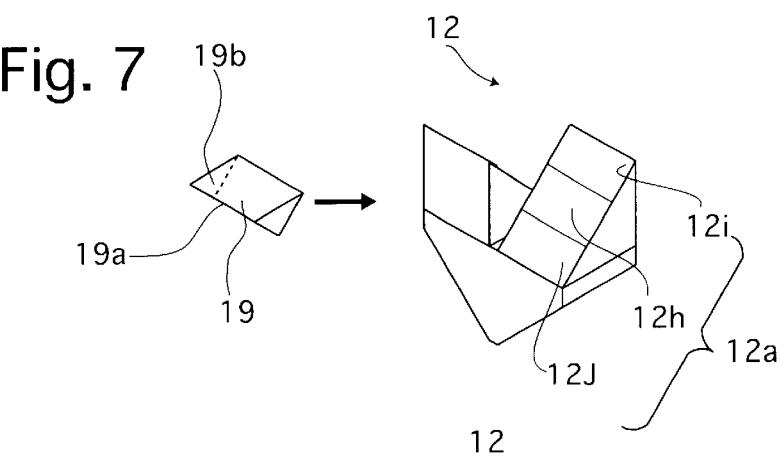
FIG. 7 is an exploded perspective view of another embodiment of the Porro-prism erecting system and the beam splitting prism.

In the above illustrated embodiment, the area of the first reflection surface 12a, except for the portion to which the beam splitting prism 19 is adhered (i.e., the semitransparent surface 12h), is formed as a total reflection surface. However, it is possible to form the whole area of the first reflection surface 12a as a semitransparent surface. The variation of phase angle of light before and after the light is incident on a total reflection surface of glass is different from the phase angle before and after the light which is incident on a semitransparent surface of a glass at different wavelengths. Therefore, if the whole area of the first reflection surface 12a is formed as a substantially uniform semitransparent surface, no optical interference due to the variation of the phase angle of light occurs, which achieves a high-contrast vision of the sighting telescope 10. FIG. 7 shows another embodiment of the Porro-prism erecting system and the beam splitting prism, and FIG. 8 shows another embodiment of the Porro-prism erecting system and the beam splitting prism, each of which the whole effective area of the first reflection surface 12a is designed so that the variation of the phase angle of light before and after the light is incident thereon is substantially even at different wavelengths.

In the embodiment shown in FIG. 7, each of upper and lower reflection surfaces 12i and 12j of the first reflection surface 12a which are positioned adjacent to the semitransparent surface 12h on the opposite sides thereof is covered by a semitransparent material such as metallic film to formed semitransparent surfaces thereon. The semitransparent surfaces of the upper and lower reflection surfaces 12i and 12j are designed so that the variation of the phase angle of light before and after the light is incident on each of upper and lower reflection surfaces 12i and 12j becomes approximately equal to the phase angle before and after the light is incident on the semitransparent surface 12h.

Figure 8:
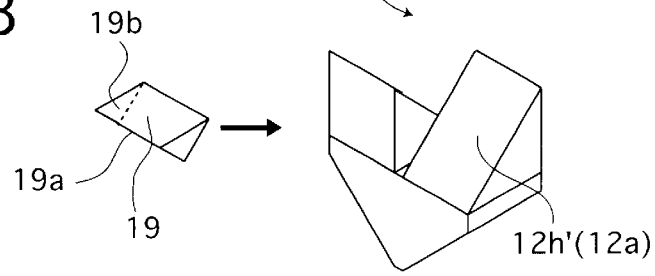
FIG. 8 is an exploded perspective view of another embodiment of the Porro-prism erecting system and the beam splitting prism.

In the embodiment shown in FIG. 8, the whole effective area of the first reflection surface 12a is formed as a semitransparent surface 12h', so that the variation of the phase angle of light before and after the light is incident thereon is substantially even at different wavelengths. The Porro-prism erecting system 12 shown in FIG. 8 is made in a manner so that the beam splitting prism 19 is adhered to the semitransparent surface 12h' by an adhesive after the first reflection surface 12a is entirely formed as the semitransparent surface 12h'.

Figure 9:
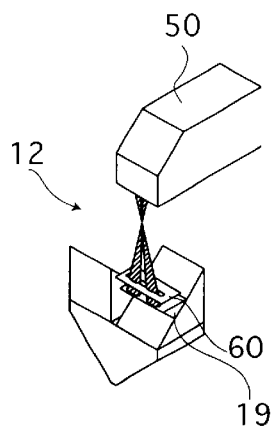
FIG. 9 is a perspective view of the AF sensor unit, the Porro-prism erecting system and the beam splitting prism fixed to the Porro-prism erecting system in the case where a light shield mask is positioned between the beam splitting prism and the AF sensor unit.

In the above described embodiments, although the separate areas 11A' and 11B' are within the area of the exit surface 19b of the beam splitting prism 19, the separate areas 11A' and 11B' can be partly outside of the area of the exit surface 19b of the beam splitting prism 19. In this case, it is preferable that a light shield mask 60 be disposed between the exit surface 19b and the AF sensor unit 50 as shown in FIG. 9 so that the two light bundles which are respectively passed through the two different separate areas 11A' and 11B' are incident on the pair of line sensors 54 uniformly, respectively. The two light bundles which are respectively passed through the two different separate areas 11A' and 11B', are partly cut out by the light shield mask 60 so that the two light bundles which pass through the light shield mask are respectively incident on the pair of line sensors 54 uniformly. The whole surface of the light shield mask 60 is preferably formed as non-reflective surface to prevent the surface of the light shield mask 60 from reflecting the incident light irregularly.

In the above described embodiments, since the two light bundles which are respectively passed through the two different pupil areas 11A and 11B at the objective lens 11 are incident on the semitransparent surface 12h at the same incident angle, the variation in the quantity of light between the two light bundles due to the difference between the incident angles of the two light bundles on the semitransparent surface 12h does not occur when the autofocus operation is performed. Accordingly, the autofocus operation is performed without optical interference even if the semitransparent surface 12h and the surface of the beam splitting prism 19 which is adhered to the semitransparent surface 12h are formed smaller than the effective area of the first reference surface 12a.

The present invention can be applied not only to an electronic distance meter (EDM), but also to any surveying instrument such as a level.

As can be understood from the foregoing, a compact surveying instrument having a phase-difference detection type focus detecting device and a Porro-prism erecting system provided with a beam splitting surface with a bright field of view of the sighting telescope is achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A surveying instrument comprising:

a sighting telescope having an objective lens and an eyepiece for sighting an object;

a Porro-prism erecting system positioned between said objective lens and said eyepiece;

a semitransparent surface formed on a reflection surface of said Porro-prism erecting system;

a beam splitting prism adhered to said semitransparent surface, wherein a width of said beam splitting prism is substantially identical to a width of said first reflection surface, and a length of said beam splitting prism, which is adhered to said semitransparent surface, is shorther than a length of said first reflection surface, said beam splitting prism having an elongated shape and said first reflection surface having a generally rectangular shape; and a phase-difference detection type focus detecting device which is positioned to receive light which is passed through said semitransparent surface and said beam splitting prism to detect a focus state from a correlation between a pair of images respectively formed by two light bundles which are respectively passed through two different pupil areas of said objective lens and passed through two separate areas on said semitransparent surface;

wherein an area of a surface of said beam splitting prism which is adhered to said semitransparent surface is smaller than an effective area of said reflection surface of said Porro-prism erecting system;

wherein said semitransparent surface and said beam splitting prism are positioned so that said two light bundles which are respectively passed through said two different pupil areas of said objective lens are incident on said semitransparent surface at the same incident angle;

wherein said elongated shape of siad beam splitting prism is determined so that said two light bundles which are respectively passed through said two different portions of said objective lens are incident on said first reflection surface at generally the same incident angle; and wherein a portion of said first reflection surface to which said beam splitting prism is not adhered is configured such that variation of the phase angle of light before and after said light is incident on said portion of said first reflection surface becomes approximately equal to the phase angle before and after said light is incident on said semitransparent surface.

2. The surveying instrument according to claim 1, wherein said semitransparent surface is formed on the whole effective area of said first reflection surface.

3. The surveying instrument according to claim 1, wherein the length of said beam splitting prism, in a direction of said optical axis of said sighting telescope, is less than a thickness of said Porro-prism erecting system.

4. The surveying instrument according to claim 1, wherein said Porro-prism erecting system comprises three right angle prisms which include said first reflection surface, a second reflection surface, a third reflection surface and a fourth reflection surface.

5. The surveying instrument according to claim 1, further comprising a light shield mask positioned between an exit surface of said beam splitting prism and phase-difference detection type focus detecting device.

6. The surveying instrument according to claim 1, wherein said sighting telescope comprises a focus adjustment lens positioned between said objective lens and said Porro-prism erecting system.

7. The surveying instrument according to claim 1, wherein:

said beam splitting prism has a reflection surface; and said light passing through said semitransparent surface and incident on said beam splitting prism is reflected on said reflection surface of said beam splitting prism, and then is directed to said phase-difference detection type focus detecting device.

* * * * *